United States Patent [19]

Lindner et al.

[11] Patent Number: 5,750,608
[45] Date of Patent: May 12, 1998

[54] EXTERNAL LUBRICANT COMPOSITIONS FOR RIGID VINYL POLYMERS

[75] Inventors: Robert Lindner, N. Wales, Pa.; Eric Alan Dudek, Clarksburg, Mass.; Bernard Daniel Louies, Brussels, Belgium

[73] Assignee: AlliedSignal Inc., Morristownship, N.J.

[21] Appl. No.: 689,327

[22] Filed: Aug. 7, 1996

Related U.S. Application Data

[63] Continuation of Ser. No. 282,393, Jul. 28, 1994, abandoned, which is a continuation-in-part of Ser. No. 105,826, Aug. 11, 1993, Pat. No. 5,426,144.

[51] Int. Cl.$^6$ .................................................. C08K 5/01
[52] U.S. Cl. .................. 524/399; 524/414; 524/423; 524/490
[58] Field of Search ........................... 524/399, 414, 524/423, 490, 491

[56] References Cited

U.S. PATENT DOCUMENTS

| | | | |
|---|---|---|---|
| 3,060,163 | 10/1962 | Erchak | 525/388 |
| 3,322,711 | 5/1967 | Bush et al. | 525/388 |
| 3,442,837 | 5/1969 | Brotz et al. | 524/397 |
| 3,756,999 | 9/1973 | Stetter et al. | 525/388 |
| 3,979,347 | 9/1976 | Brotz et al. | 525/388 |
| 4,132,691 | 1/1979 | Ejk | 524/180 |
| 4,203,880 | 5/1980 | Stoloff . | |
| 4,218,353 | 8/1980 | Kim | 260/28.5 |
| 4,501,850 | 2/1985 | Bourland | 525/239 |
| 5,064,908 | 11/1991 | Schuster et al. | 525/388 |

FOREIGN PATENT DOCUMENTS

| | | |
|---|---|---|
| 0011455 | 5/1980 | European Pat. Off. . |
| A 0 011 455 | 5/1980 | European Pat. Off. . |
| 0044616 | 1/1981 | European Pat. Off. . |
| A 0 044 616 | 1/1981 | European Pat. Off. . |
| 446616 | 1/1982 | European Pat. Off. . |
| 0418966 | 3/1991 | European Pat. Off. . |
| A 0 418 966 | 3/1991 | European Pat. Off. . |
| 2751177 | 5/1978 | Germany . |

OTHER PUBLICATIONS

Illmann "Waxes as Lubricating in Plastics Processing" SPE Journal, 71 (Jun. 1967).
King et al "Characterization . . . Chloride"—Polymer Engineering& Science, 12(2) 112, (Mar. 1972).
Hurwitz "The Use . . . Lubrication"—Society of Plastics Engineers 31rst Annual Meetings Tech. Conf. 349 (May 1973).
Technical Data on A.C (R) Polyethylenses and Copolymers for Plastics by Allied Signal Inc. (1973).
Cogswell—"Influence . . . Chloride"—Pure& Applied Chem. 55(1); 177 (1983).
A–C (R) Polyethylenes for PVC by Allied Signal Inc. (1986).
Kosior et al "Processing Aids . . . Chloride" British Polymer Journal 18(2), 94 (1986).
Technical Data Sheet for Low Molecular Weight Polyethylenes and Derivatives by Allied Signal Inc. (1992).
Lindner "External Lubricants That Speed Fusion"—Plastics Compounding, (Sep./Oct. 1989).
Plastics Additives Handbook, Hanser Pub. 468 (1990).
Technical Data for Low Molecular Weight Polyethylenes and Derivatives—Allied Signal Inc. (1986).
Technical Data for A–C Polyethlenes and Copolymers for Plastics—PL–8—Allied Chemical (1973).
Waxes As Lubricants In Plastics Processing; Guenther Illmann; SPE Journal, Jun. 1967 pp. 71–76.
Characterization of Lubricants for Polyvinyl Chloride; L.F. King and F. Noel; Polymer Engineering and Science, Mar. 1972, vol. 12, No. 2 pp. 112–119.
A–C® Polyethylene & Copolymers for Plastics; Technical Data; Recommended Concentrations of A–C® Polyethylene Lubricants For PVC Processing (1973)—Allied Chemical.
Guenther Illmann, "Waxes as Lubricants in Plastics Processing", SPE Journal, Jun. 1967, pp. 71–76.
L.F. King and F. Noel, "Characterization of Lubricants for Polyvinyl Chloride," Polymer Engineering and Science, Mar. 1972, vol. 12, No. 2, pp. 112–119.
David Hurwitz, The Use of Low Molecular Weight Polyethylene in Rigid PVC Lubrication, Society of Plastics Engineers 31st Annual Technical Conference, May 1973, vol. 19, pp. 349–354.
G.N. Cogswell, "Influence of Acrylic Processing Aids on the Rheology and Structure of Polyvinyl Chloride", Pure& Appl. Chem., vol. 55, No. 1 (1983), pp. 177–190.
Product Literature entitled "The Use of A–C Polyethylenes in Processing PVC" © 1986 Allied–Signal Inc.
Robert A. Lindner, "External Lubricants That Speed Fusion," Plastics Compounding, Sep./Oct. 1989 (Reprint).
E.I. Kosior and Z.H. Stachurski, "Processing Aids: The Effect of Polymethyl Methacrylate on the Fusion of Rigid Poly(vinyl chloride)" British Polymer Journal, vol. 18, No. 2 (1986) pp. 94–104.
Product Literature entitled "Technical Data for Low Molecular Weight Polyethylenes and Derivatives" © 1992 Allied–Signal Inc.

Primary Examiner—Veronica P. Hoke
Attorney, Agent, or Firm—Melanie L. Brown; Roger H. Criss; Colleen D. Szuch

[57] ABSTRACT

The present invention provides an external lubricant composition for lead stabilized vinyl polymer. The external lubricant functions as both an external lubricant and a processing aid by speeding fusion and thus, obviates the need for a separate processing aid. The external lubricant comprises an effective amount for lubricating vinyl polymer of polyethylene having a Brookfield viscosity at a temperature of 150° C. of between about 1000 and about 100000 centipoises and an acid number as determined by standardized titration of KOH of between about 1 and about 40.

12 Claims, No Drawings

EXTERNAL LUBRICANT COMPOSITIONS FOR RIGID VINYL POLYMERS

This application is a continuation of application Ser. No. 08/282,393 filed Jul. 28, 1994, now abandoned, which in turn is a continuation-in-part of application Ser. No. 08/105,826 filed Aug. 11, 1993 now U.S. Pat. No. 5,426,144, issued Jun. 20, 1995.

The present invention relates to external lubricant compositions for rigid vinyl polymers and more particularly, to external lubricant compositions for rigid polyvinyl chloride.

BACKGROUND OF THE INVENTION

Rigid vinyl polymer compositions, such as polyvinyl chloride compositions, are utilized for producing a variety of structural articles such as plastic pipe, siding, containers, and sheets. These rigid compositions are substantially unplasticized.

In order to stabilize vinyl polymer against the decomposing influence of heat and light, basic lead compounds such as tribasic lead sulfate, dibasic lead phosphite, or dibasic lead phosphite sulfite are used. To enhance the effect of these lead compounds, typically metal soaps such as neutral or basic lead stearate and/or calcium stearate are added.

Lubricants are also added to vinyl polymers to facilitate the extrusion or other melt processing of the structural articles produced. Lubricants are generally classified as external or internal lubricants. An external lubricant provides a lubricating layer between the plastic melt and the metallic surfaces of the processing equipment. The external lubricant serves to coat the individual particles of the polymeric resin and inhibits their adherence to the metallic surfaces. In contrast, an internal lubricant reduces the effective melt viscosity of the vinyl polymer at the processing temperatures in order to improve its flow properties during processing as well as to promote fusion. An internal lubricant is generally needed only for thin extrusions such as films and thin-walled pipe.

The suitability of lubricants for vinyl polymer is determined by the type of stabilizer used in the vinyl polymer. For example, the PLASTICS ADDITIVE HANDBOOK, 3rd Edition (Hanser Publishers 1990) teaches that calcium stearate, stearic acid, hydroxystearic acid, unoxidized polyethylene waxes, paraffin waxes, microwaxes, and FT-waxes (synthetic wax produced by Fischer Trosch process) are suitable lubricants for lead stabilized polyvinyl chloride thick-walled pipes.

As discussed by Kosior et al., "Processing Aids: The Effect of Polymethyl Methacrylate on the Fusion of Rigid Poly(vinyl chloride)", British Polymer Journal 18(2), 94 (1986), lubricants, in addition to preventing adhesion to metal surfaces, have been shown to retard the progress of fusion of polyvinyl chloride. Processing aids based on polymethyl methacrylate are effective in accelerating the rate of fusion of polyvinyl chloride and are currently used in such compositions. For example, Kosior et al. teach a lead stabilized polyvinyl chloride which used a polymethyl methacrylate processing aid. See also Cogswell, "Influence of Acrylic Processing Aids on the Rheology and Structure of Polyvinyl Chloride", Pure & Appl. Chem, 55(1), 177 (1983).

Known lead stabilized rigid polyvinyl chloride pipe formulations include compositions such as:

| Resin | PVC | 100 phr |
|---|---|---|
| Pigment | Titanium Dioxide | 1.0 |
| Filler | Coated CaCO$_3$ | 5.0 |
| Stabilizer | Tribasic lead sulfate | 1.0 |
| Co-Stabilizer | Lead stearate | 0.8 |
| Co-Stabilizer/Lubricant | Calcium Stearate | 0.4 |
| Internal Lubricant | Steryl Stearate | 0.6 |
| External Lubricant | A-C ® 6A (unoxidized homopolymer polyethylene wax, Brookfield viscosity at 140° C. of 350 cps | 0.2 |
| External Lubricant | A-C ® 629 (oxidized polyethylene wax, Brookfield viscosity at 140° C. of 200 cps) | 0.15 | which is disclosed in TECHNICAL DATA FOR LOW MOLECULAR WEIGHT POLYETHYLENES AND DERIVATIVES by AlliedSignal Inc., a chapter of the POLYMER ADDITIVE HANDBOOK (1992);

| Rigid 4-Cell Resin | 100 phr |
|---|---|
| Lead Stabilizer | 5.0 |
| Calcium Carbonate | 1.5 |
| Titanium Dioxide | 2.0 |
| Acrylic Processing Aid | 3.0 |
| Calcium Stearate | 1.0 |
| A-C ® 629A (oxidized polyethylene wax, Brookfield viscosity at 140° C. of 200 centipoises) | 0 to 1 | which is disclosed by David Hurwitz, "The Use of Low Molecular Weight Polyethylene in Rigid PVC Lubrication", Society of Plastics Engineers, 31st Annual Technical Conference, 349 (May 1973), and

| PVC | 100 phr |
|---|---|
| Tribasic Lead Sulfate | 0.5 |
| Dibasic Lead Stearate | 1.0 |
| Calcium Stearate | 0.4 |
| Stearic Acid | 0.4 |
| A-C ® 617A (unoxidized homopolymer polyethylene wax, Brookfield viscosity at 140° C. of 180 centipoises) | 0.2–0.4 | which is disclosed in A-C® POLYETHYLENES FOR PVC by AlliedSignal Inc. (1986). See also Technical Data on A-C® Polyethylenes and Copolymers for Plastics by AlliedSignal Inc. (1973) which teaches that A-C® 629A (low density oxidized polyethylene wax) is useful for lead stabilized polyvinyl chloride.

Additives which speed fusion in polyvinyl chloride compositions are desired in the art. ASTM D 2538 defines fusion time as the time from the point of loading the composition into the torque rheometer to the point of maximum torque. See also Robert A. Lindner, "External Lubricants that Speed Fusion", Plastics Compounding (September/October 1989). The first and third formulations above are undesirable because the unoxidized homopolymer polyethylene wax having a Brookfield viscosity at 140° C. of 180 or 350 centipoises delays fusion and thus, increases fusion time. Additionally, the unoxidized homopolymer polyethylene wax serves as more of a fusion control rather than an external lubricant and thus, it is necessary to add an additional external lubricant such as oxidized polyethylene wax having a Brookfield viscosity at 140° C. of 200 centipoises or stearic acid to the composition. Although the first and third formulations above have good lubricity, the fusion times are too long. Additionally, stearic acid has a low melting point which means that it evaporates during normal processing conditions.

The second formulation above is undesirable because a processing aid is used which increases the cost of the final composition. Also, the presence of an acrylic processing aid in the final product may cause high viscosity and poor flow.

U.S. Pat. No. 4,203,880 discloses tin stabilized polyvinyl chloride having a lubricant package comprising oxidized polyethylene wax and a known external lubricant such as paraffin oils, paraffin waxes, liquid and solid hydrocarbons, unoxidized polyethylene waxes, montan ester waxes, lead stearate, mineral oil, 12-hydroxystearic acid, ethylene bis-stearamide, and glycol esters of fatty acids that contain 10 to 20 or more carbon atoms and cites two articles which teach the preceding known external lubricants: Illmann, "Waxes as Lubricants in Plastics Processing", *SPE Journal*, 71 (June 1967) and King et al., "Characterization of Lubricants for Polyvinyl Chloride", *Polymer Engineering and Science* 12(2), 112 (March 1972).

U.S. Pat. No. 4,203,880 also discloses that other heat stabilizers useful with polyvinyl chloride include organosulfur-containing antimony compounds and alkaline earth metal salts of carboxylic acids. The reference further states that the known external lubricants and oxidized polyethylene waxes should be compatible with most, if not all, of the conventional heat stabilizers used for polyvinyl chloride. However, Illmann, "Waxes as Lubricants in Plastics Processing", *SPE Journal*, 71 (June 1967) and King et al., "Characterization of Lubricants for Polyvinyl Chloride", *Polymer Engineering and Science* 12(2), 11 2 (March 1972) only teach tin, calcium/zinc, and barium/cadmium stabilizers in combination with the known external lubricants. Additionally, although the PLASTICS ADDITIVE HANDBOOK 3rd Edition (Hanser Publishers 1990) teaches that oxidized polyethylene waxes are suitable for tin stabilized thick-walled polyvinyl chloride, the reference does not teach that oxidized polyethylene waxes are suitable for lead stabilized thick-walled polyvinyl chloride.

It would be desirable to have a lead stabilized vinyl polymer composition which has improved fusion time, i.e. reduced fusion time. It would also be desirable to have a lead stabilized vinyl polymer composition which has improved fusion time, i.e. reduced fusion time, in the absence of a resinous processing aid such as an acrylic processing aid.

SUMMARY OF THE INVENTION

We have found a composition which responds to the foregoing need in the art. Surprisingly, we have found an external lubricant composition for lead stabilized vinyl polymer wherein the external lubricant not only functions as an external lubricant but also functions as a processing aid to speed fusion. Thus, the need for a processing aid is obviated and as a result, the cost of the final product is reduced. In addition, the amount of the present external lubricant required is less than the combined amount of currently used lubricant and processing aid.

The present external lubricant composition for lead stabilized vinyl polymer wherein the external lubricant eliminates the need for a resinous processing aid comprises: an effective amount for lubricating the vinyl polymer of polyethylene having a Brookfield viscosity at a temperature of 150° C. of between about 1000 and about 100000 centipoises and an acid number as determined by standardized titration of KOH of between about 1 and about 40.

The present invention also provides a composition comprising: (a) vinyl polymer; (b) an effective amount for stabilizing the vinyl polymer of lead stabilizer and metallic stearate; and (c) an effective amount for lubricating the vinyl polymer of polyethylene having a Brookfield viscosity at a temperature of 150° C. of between about 1000 and about 100000 centipoises and an acid number as determined by standardized titration of KOH of between about 1 and about 40.

The present invention also provides a method for decreasing Brabender fusion time in a lead stabilized vinyl polymer comprising the step of: adding an effective amount for lubricating the vinyl polymer of polyethylene having a Brookfield viscosity at a temperature of 150° C. of between about 1000 and about 100000 centipoises and an acid number as determined by standardized titration of KOH of between about 1 and about 40.

Other advantages of the present invention will be apparent from the following description and attached claims.

DETAILED DESCRIPTION OF THE PREFERRED EMBODIMENTS

Vinyl polymers useful in the present invention include polyvinyl chloride and polymerized forms of vinyl acetate, vinyl chloride-vinyl acetate copolymers, vinylidene halides such as vinylidene chloride vinyl pyridine, vinyl carbazole styrene, vinylbenzene, acrylic esters such as methyl acrylate, ethyl acrylate, or methylmethacrylate as well as acrylonitrile. The preferred vinyl polymer is polyvinyl chloride which includes both homopolymers of vinyl chloride and both copolymers and terpolymers of vinyl chloride with comonomers such as vinyl acetate, vinyl formate, alkyl vinyl ethers, ethylene, propylene, butylene, vinylidene chloride, alkyl acrylates and methacrylates, alkyl maleates, and alkyl fumarates. Preferably, at least 80% and more preferably 100% of the monomer to be polymerized will be a vinyl chloride monomer. Vinyl polymers useful in the present invention are commercially available.

Lead stabilizers useful in the present invention include tribasic lead sulfate, tetrabasic lead sulfate, dibasic lead phosphite, dibasic lead phosphite sulfite, and lead phthalate. The preferred lead stabilizer is tribasic lead sulfate. Lead stabilizers useful in the present invention are commercially available.

In order to enhance the effect of the lead compounds, typically metal soaps such as metallic stearates are also added. Preferred metallic stearates include cadium stearate, manganese stearate, cesium stearate, lead stearate, lithium stearate, strontium stearate, sodium stearate, calcium stearate, barium stearate, and magnesium stearate. The more preferred metallic stearates are lead stearate, calcium stearate, and barium stearate. The most preferred metallic stearate is lead stearate. Metallic stearates useful in the present invention are commercially available.

An effective amount for stabilizing the vinyl polymer of the lead stabilizer and metallic stearate is used. Typically, the lead stabilizer and metallic stearate are present in an amount of about 0.25 to about 5 parts by weight per 100 parts of vinyl polymer. Typically, the ratio of lead stabilizer to metallic stearate is about 1:10 to about 10:1.

The polyethylene of the present invention has a Brookfield viscosity at a temperature of 150° C. of between about 1000 and about 100000 centipoises and an acid number as determined by standardized titration of KOH of between about 1 and about 40. Suitable polyethylenes may be characterized as oxidized high density homopolymers of ethylene, copolymers containing acrylates and ethylene, terpolymers containing acrylates, esters, and ethylene. Preferably, oxidized high density homopolymers of ethylene are used. These polyethylenes have been oxidized to an acid number as determined by a standardized titration of KOH of more preferably between about 5 and about 40, and most preferably between about 5 and about 35. These polyethylenes typically have a density as determined by ASTM D-1505 in the range of about 0.85 to about 1.05, more preferably in the range of about 0.98 to about 1.05, and most preferably in the range of about 0.98 to about 1.00. These oxidized polyethylenes exhibit a Brookfield viscosity at a temperature of 150° C. of more preferably in the range of between about 2000 and about 90000 centipoises and most preferably in the range of between about 2500 and about 85000 centipoises.

Suitable oxidized polyethylenes are available from AlliedSignal Inc., Morristown, N.J. Preferred oxidized polyethylenes are listed in the following Table:

| Oxidized Polyethylene | Acid Number (mgKOH/ gram) | Density (grams/cc) | Brookfield Viscosity (cps at 150° C.) |
| --- | --- | --- | --- |
| A-C ® 307A | 5–9 | 0.98 | >80000 |
| A-C ® 316A | 15–18 | 0.98 | 8500 |
| A-C ® 330 | 28–32 | 0.99 | 3600 |
| A-C ® 392 | 28–32 | 0.99 | 4500 |

The more preferred oxidized polyethylenes are A-C® 307A and A-C® 316A oxidized polyethylenes. The most preferred oxidized polyethylene is A-C® 307A oxidized polyethylene.

These oxidized polyethylenes as well as others which are useful in the practice of the present invention may be obtained by oxidizing polyethylenes with air or oxygen by convention procedures. Suitable methods are described in U.S. Pat. Nos. 3,060,163 and 3,322,711 which are incorporated herein by reference. As those skilled in the art know, the oxidation results in the scission of the polymer and the formation of acid groups. In addition to the formation of acid groups on the polymer chain, esters, aldehydes, ketones, hydroxides, and peroxides are also found in various quantities along the polymer chains.

If too little lubricant is present in the final vinyl polymer composition, the melt viscosity of the vinyl polymer composition may be too high or the fusion time may be too short. An extremely short fusion time is undesirable for extrudable compositions because this may result in prolonged exposure of the polymer melt to elevated temperatures which results in premature degradation. If too much lubricant is present in the final vinyl polymer composition, a condition referred to as "plate out" may occur. The excess lubricant rises to the surface of the vinyl polymer composition and remains in contact with the heated wall of the extruder, mill, or calendar roll for a sufficient time to become charred. The char is either carried along with the molten polymer causing discoloration, or the char may form deposits along the inner wall or in the die of an extruder, thereby altering the shape of the extruder article.

An effective amount for lubricating the vinyl polymer of oxidized polyethylene is used. Typically, the oxidized polyethylene is present in an amount of about 0.01 to about 10 parts by weight per 100 parts of vinyl polymer. The oxidized polyethylene is present preferably in an amount of about 0.05 to about 5 parts by weight per 100 parts of vinyl polymer, more preferably in an amount of about 0.05 to about 1 part by weight per 100 parts of vinyl polymer, and most preferably in an amount of about 0.1 to about 1 part by weight per 100 parts of vinyl polymer.

In addition to the heat stabilizer, metallic stearate, and external lubricant, the present compositions may contain one or more additives conventionally employed in moldable or extrudable polymer compositions. These additives include fillers such as alkaline earth metal carbonates, pigments such as titanium dioxide, antioxidants such as sterically hindered phenols or bis-phenols, impact modifiers such as methyl methacrylate-butadiene-styrene terpolymers, and adsorbents such as the alkaline earth metal silicates and diatomaceous earth if the composition contains a significant amount of liquid ingredients.

The vinyl compositions to which the present external lubricants are added are rigid which means that they contain essentially no plasticizer. Such vinyl resins are useful in the production of rigid articles, principally rigid pipe, siding, containers, and sheets.

It is known that the effectiveness of lubricants on resin formulations may be evaluated by measurement of rheological properties of the formulation. These properties are typically studied by means of a torque rheometer consisting of a miniature mixer and a torque meter which measure the load on the mixer. The mixing forces developed within a sample of material at a certain temperature cause a deflection of a recording dynamometer. This deflection is recorded on a strip chart. This torque, which is expressed in meter-grams, is directly related to the viscosity of the melt being mixed. When a polymer of the vinyl type degrades, it crosslinks rapidly and shows a sharp rise in its melt viscosity. The time for this to occur is a measure of the thermal stability under dynamic shear conditions. A typical torque rheometer curve provides one skilled in the art with information as to melting, fusion, flow, and crosslinking in the processing of the polymer tested. This procedure is set forth in ASTM D 2538-88—"Standard Practice for Fusion of Poly(Vinyl Chloride)(PVC) Compounds Using a Torque Rheometer".

The most generally used rheometer is the Brabender Plasticorder which essentially consists of an oil-heated roller mixing head driven by a variable speed motor equipped with means to measure the torque developed in the head. The machine is fitted with a mixing head equipped with a melt thermocouple. To determine the fusion time of a polyvinyl chloride powder blend, for example, an accurately weighed quantity of the blend is charged into the mixing head with the aid of a quick-loading chute. A graph of the torque against time is produced and the point when fusion is complete is shown by an initial peak in torque. The dynamic heat stability is measured in minutes from the start of the graph until the decomposition point which is marked by a rise in torque.

The present invention is more fully illustrated by the following non-limiting Examples. Unless otherwise stated, all parts are by weight.

COMPARATIVES AND EXAMPLES

For each Example, the effect of the present external lubricants for polyvinyl chloride pipe compounds was determined utilizing a Brabender Plasticorder at 190° C. jacket temperature, at 60 RPM, and sample size of 4OxSPG. Each composition was prepared by blending in a Henschel mixer for 10 minutes at 3800 RPM and for an additional 10 minutes at 2600 RPM. The fusion time and torque fusion were determined from the plastogram and are recorded below. The present lubricants used were A-C® 307A and A-C® 316A oxidized polyethylenes which are commercially available from AlliedSignal Inc., Morristown, N.J., United States of America. The properties of these oxidized polyethylenes are as follows:

| Oxidized Polyethylene | Acid Number (mgKOH/ gram) | Density (grams/cc) | Brookfield Viscosity (cps at 150° C.) |
|---|---|---|---|
| A-C ® 307A | 5–9 | 0.98 | >80000 |
| A-C ® 316A | 15–18 | 0.98 | 8500 |

The Comparatives were run in the same manner as the Examples except that currently used lubricants with or without processing aids were used instead of the present lubricants.

For each Comparative and Example, the resin used was Shintech 950 PVC and the filler used was Atomite $CaCO_3$. The pigment used was Titanox 201 $TiO_2$ and the lead stabilizer used was Baerostab V220MC Tribasic Lead Stabilizer (abbreviated as TBLS below). The lead stearate used was Baerostab Pb28F and the paraffin used had a melting point of 72° C. The stearic acid used was Unichema 4911 stearic acid. The acrylic processing aid used was Kaheka PA-20 (abbreviated as PA 1 below) or Metablend P501 (abbreviated as PA 2 below). The oxidized polyethylene wax used was A-C® 629 oxidized polyethylene wax having a Brookfield viscosity at 140° C. of 200 centipoises and the unoxidized polyethylene wax used was A-C® 617 unoxidized polyethylene wax having a Brookfield viscosity at 140° C. of 180 centipoises.

| COMPARATIVES A THROUGH C | | | |
|---|---|---|---|
| Component | COMP. A | COMP. B | COMP. C |
| PVC | 100 | 100 | 100 |
| $CaCO_3$ | 3.0 | 3.0 | 3.0 |
| $TiO_2$ | 1.0 | 1.0 | 1.0 |
| TBLS | 0.35 | 0.35 | 0.35 |
| Lead Stearate | 1.5 | 1.5 | 1.5 |
| Paraffin | 0.4 | 0.4 | 0.4 |
| Stearic Acid | 0.3 | 0.1 | 0.8 |
| Total Weight (grams) | 58.1 | 58.2 | 57.9 |
| Brabender Fusion Time (minutes) | 15.5 | 12.8 | 15.7 |
| Maximum Torque (meter-grams) | 1850 | 1800 | 1725 |

| COMPARATIVES D THROUGH G | | | | |
|---|---|---|---|---|
| Component | COMP. D | COMP. E | COMP. F | COMP. G |
| PVC | 100 | 100 | 100 | 100 |
| $CaCO_3$ | 3.0 | 3.0 | 3.0 | 3.0 |
| $TiO_2$ | 1.0 | 1.0 | 1.0 | 1.0 |
| TBLS | 0.35 | 0.35 | 0.35 | 0.35 |
| Lead Stearate | 1.5 | 1.5 | 1.5 | 1.5 |
| Paraffin | 0.4 | 0.4 | 0.4 | 0.4 |
| Stearic Acid | 0.3 | 0.3 | 0.3 | 0.3 |
| PA1 | 0.3 | 0.8 | 1.5 | 2.0 |
| Total Weight (grams) | 57.7 | 57.7 | 57.6 | 57.5 |
| Brabender Fusion Time (minutes) | 17.4 | 17.5 | 19.1 | 16.8 |
| Maximum Torque (meter-grams) | 1875 | 2000 | 2150 | 2250 |

Unlike Comparatives A through C, Comparatives D through G contained a processing aid (PA1). Comparing Comparatives D through G with Comparative A because they all contained 0.3 phr stearic acid, the fusion time increased when the processing aid (PA1) was added in Comparatives D through G.

| COMPARATIVES H THROUGH K | | | | |
|---|---|---|---|---|
| Component | COMP. H | COMP. I | COMP. J | COMP. K |
| PVC | 100 | 100 | 100 | 100 |
| $CaCO_3$ | 3.0 | 3.0 | 3.0 | 3.0 |
| $TiO_2$ | 1.0 | 1.0 | 1.0 | 1.0 |
| TBLS | 0.35 | 0.35 | 0.35 | 0.35 |
| Lead Stearate | 1.5 | 1.5 | 1.5 | 1.5 |
| Paraffin | 0.4 | 0.4 | 0.4 | 0.4 |
| Stearic Acid | 0.3 | 0.3 | 0.3 | 0.3 |
| PA2 | 0.3 | 0.8 | 1.5 | 2.0 |
| Total Weight (grams) | 58.1 | 58.0 | 57.9 | 57.8 |
| Brabender Fusion Time (minutes) | 12.5 | 10.5 | 9.0 | 6.8 |
| Maximum Torque (meter-grams) | 1850 | 1950 | 2000 | 2075 |

Unlike Comparatives A through C, Comparatives H through K contained a processing aid (PA2). Comparing Comparatives H through K with Comparative A because they all contained 0.3 phr stearic acid, the fusion time decreased when the processing aid (PA2) was added in Comparatives H through K.

| COMPARATIVES L THROUGH Q | | | | | | |
|---|---|---|---|---|---|---|
| Component | COMP. L | COMP. M | COMP. N | COMP. O | COMP. P | COMP. Q |
| PVC | 100 | 100 | 100 | 100 | 100 | 100 |
| $CaCO_3$ | 3.0 | 3.0 | 3.0 | 3.0 | 3.0 | 3.0 |
| $TiO_2$ | 1.0 | 1.0 | 1.0 | 1.0 | 1.0 | 1.0 |
| TBLS | 0.35 | 0.35 | 0.35 | 0.35 | 0.35 | 0.35 |
| Lead Stearate | 1.5 | 1.5 | 1.5 | 1.5 | 1.5 | 1.5 |
| Paraffin | 0.4 | 0.4 | 0.4 | 0.4 | 0.4 | 0.4 |
| A-C ® 617A | 0.3 | 0.1 | — | — | — | — |
| A-C ® 629A | — | — | 0.3 | 0.1 | 0.8 | |
| Total Weight (grams) | 57.8 | 57.8 | 57.9 | 58.2 | 58.2 | 58.0 |
| Brabender Fusion Time (minutes) | 18.1 | 15.7 | 9.8 | 10.4 | 9.6 | 9.6 |
| Maximum Torque (meter-grams) | 1775 | 1750 | 1825 | 1725 | 1800 | 1625 |

COMPARATIVES L THROUGH Q

| Component | COMP L | COMP M | COMP N | COMP O | COMP P | COMP Q |
|---|---|---|---|---|---|---|
| grams) | | | | | | |

Comparing Comparative L with Comparative A because they both contained 0.3 phr external lubricant, the fusion time increased with the unoxidized polyethylene having a Brookfield viscosity at 140° C. of 180 centipoises. Comparing Comparative M with Comparative B because they both contained 0.1 phr external lubricant, the fusion time increased with the unoxidized polyethylene having a Brookfield viscosity at 140° C. of 180 centipoises.

Comparing Comparative O with Comparative A because they both contained 0.3 phr external lubricant, the fusion time decreased with the oxidized polyethylene having a Brookfield viscosity at 140° C. of 200 centipoises. Comparing Comparative P with Comparative B because they both contained 0.1 phr external lubricant, the fusion time decreased with the oxidized polyethylene having a Brookfield viscosity at 140° C. of 200 centipoises. Comparing Comparative Q with Comparative C. because they both contained 0.8 phr external lubricant, the fusion time decreased with the oxidized polyethylene having a Brookfield viscosity at 140° C. of 200 centipoises.

EXAMPLES 1 THROUGH 6

| Component | EX. 1 | EX. 2 | EX. 3 | EX. 4 | EX. 5 | EX. 6 |
|---|---|---|---|---|---|---|
| PVC | 100 | 100 | 100 | 100 | 100 | 100 |
| $CaCO_3$ | 3.0 | 3.0 | 3.0 | 3.0 | 3.0 | 3.0 |
| $TiO_2$ | 1.0 | 1.0 | 1.0 | 1.0 | 1.0 | 1.0 |
| TBLS | 0.35 | 0.35 | 0.35 | 0.35 | 0.35 | 0.35 |
| Stearate | 1.5 | 1.5 | 1.5 | 1.5 | 1.5 | 1.5 |
| Paraffin | 0.4 | 0.4 | 0.4 | 0.4 | 0.4 | 0.4 |
| A-C ® 307A | 0.3 | 0.1 | 0.8 | — | — | — |
| A-C ® 316A | — | — | — | 0.3 | 0.1 | 0.8 |
| Total Weight (grams) | 57.8 | 57.8 | 57.7 | 58.1 | 58.2 | 58.0 |
| Brabender Fusion Time (minutes) | 3.5 | 8.4 | 1.0 | 1.7 | 4.6 | 1.0 |
| Maximum Torque (meter-grams) | 1700 | 1750 | 1800 | 1825 | 1800 | 1900 |

Comparing Examples 1 and 4 with Comparatives A, D through G, H through K, L, and O because they all contained 0.3 phr external lubricant, the fusion time decreased dramatically when the present external lubricant was used and thus, the need for a processing aid is eliminated with the present invention. Comparing Examples 2 and 5 with Comparatives B, M, and P because they all contained 0.1 phr external lubricant, the fusion time decreased dramatically when the present external lubricant was used and thus, the need for a processing aid is eliminated with the present invention. Comparing Examples 3 and 6 with Comparatives C and Q because they all contained 0.8 phr external lubricant, the fusion time decreased dramatically when the present external lubricant was used and thus, the need for a processing aid is eliminated with the present invention.

EXAMPLES 7 THROUGH 12

| Component | EX. 7 | EX. 8 | EX. 9 | EX. 10 | EX. 11 | EX. 12 |
|---|---|---|---|---|---|---|
| PVC | 100 | 100 | 100 | 100 | 100 | 100 |
| $CaCO_3$ | 3.0 | 3.0 | 3.0 | 3.0 | 3.0 | 3.0 |
| $TiO_2$ | 1.0 | 1.0 | 1.0 | 1.0 | 1.0 | 1.0 |
| TBLS | 0.35 | 0.35 | 0.35 | 0.35 | 0.35 | 0.35 |
| Barium Stearate | 1.5 | 1.5 | 1.5 | — | — | — |
| Calcium Stearate | — | — | — | 1.5 | 1.5 | 1.5 |
| Paraffin | 0.4 | 0.4 | 0.4 | 0.4 | 0.4 | 0.4 |
| A-C ® 307A | 0.3 | 0.1 | 0.8 | 0.3 | 0.1 | 0.8 |
| Total Weight (grams) | 57.0 | 57.1 | 56.9 | 56.8 | 56.9 | 56.7 |
| Brabender Fusion Time (minutes) | 0.7 | 0.7 | 0.6 | 0.75 | 0.8 | 0.6 |
| 15 Min Torque (meter-grams) | 2050 | 2100 | 2050 | 2075 | 2100 | 2050 |

These results indicate that the use of barium stearate or calcium stearate with the present lubricant also provided decreased fusion time.

For the following Comparatives and Examples, the resin used was Solvic 264GA polyvinyl chloride (abbreviated as PVC below). The lead stabilizer used was Akcros' Haro-Chem PDF dibasic lead phosphite (abbreviated as DBLP below) and the lead stearate used was Akcros' HaroChem P51 dibasic lead stearate (abbreviated as DBLS below). The calcium stearate used was Akcros' HaroChem CGL calcium stearate. The palmityl stearyl phthalate used was Henkel's Loxiol G60 palmityl stearyl phthalate (abbreviated as PSP below). The titanium dioxide used was Kronos Titan-GmbH's Kronos 2220 titanium dioxide and the filler used was Solvay's Socal 3121 calcium carbonate. The impact modifier used was Rohm & Haas' Paraloid KM334 acrylic impact modifier (abbreviated as AIM below). The pigment used was Sandoz's Rubin Graphtol BP organic red pigment. The processing aid used was Rohm & Haas' Paraloid K120N acrylic processing aid (abbreviated as PA below). The oxidized polyethylene wax used was A-C® 629 oxidized polyethylene wax having a Brookfield viscosity at 140° C. of 200 centipoises. The ethylene-vinyl acetate copolymer used was A-C® 400 ethylene-vinyl acetate copolymer which has 13 percent vinyl acetate.

The present lubricants used were A-C® 307A, A-C® 316A, and A-C® 392 oxidized polyethylenes which are commercially available from AlliedSignal Inc., Morristown, N.J., United States of America. The properties of these oxidized polyethylenes are as follows:

| Oxidized Polyethylene | Acid Number (mgKOH/gram) | Density (grams/cc) | Brookfield Viscosity (cps at 150° C.) |
|---|---|---|---|
| A-C ® 307A | 5–9 | 0.98 | >80000 |
| A-C ® 316A | 15–18 | 0.98 | 8500 |
| A-C ® 392A | 28–32 | 0.99 | 4500 |

The purpose of the following test was to evaluate the plate-out or residue of a PVC formulation using a red organic pigment as indicator. For each Comparative and Example, each formulation was mixed in a high speed Papenmeier mixer up to 120° C. After cooling down to room temperature, 250 grams of each formulation were mixed in a high speed Braun mixer (Type MX32) with an addition of 2.5 grams of Sicored WPC organic pigment during a two minute period.

Each formulation was then processed on a two-roll mill for 5 minutes at 190° C. with a gap of 0.4 mm. The sheet formed was then thrown away. The result was that the plate-out/residue in addition to some pigment stuck to the 10 cylinder. In order to recuperate this material, the following formulation (250 grams) was processed on the two-roll mill for 3 minutes at 190° C. and with a gap of 0.7 mm. The lead sulphate used was Akcros' HaroChem PTS-E tribasic lead sulphate and the lead stearate used was Akcros' HaroChem P28G neutral lead stearate. The calcium carbonate used was Solvay's Socal 3121 calcium carbonate and the titanium dioxide used was Kronos Titan GmbH's Kronos 2220 titanium dioxide. The di-octyl phthalate used was an Exxon product (abbreviated as DOP below) and the stearic acid used was Oleofina's Radiacid 423 stearic acid.

| PVC-S-K64 | 100 |
|---|---|
| Tribasic Lead Sulphate | 3 |
| Neutral Lead Stearate | 0.2 |
| CaCO$_3$ | 1 |
| TiO$_2$ | 1 |
| DOP | 25 |
| Stearic Acid | 0.1 |
| A-C ® 629A | 0.3 |

Plate-out was determined by this second compound (color) which was directly proportional to the intensity of the residue. If no plate-out occurred, the color was white. If some plate-out occurred, the color was pink. If more plate-out occurred, the color was red. If alot of plate-out occurred, the color was dark red.

COMPARATIVES R THROUGH T

| Component | COMP. R | COMP. S | COMP. T |
|---|---|---|---|
| PVC | 100 | 100 | 100 |
| DBLP | 3 | 3 | 3 |
| DBLS | 1 | 1 | 1 |
| Ca Stearate | 0.5 | 0.5 | 0.5 |
| PSP | 0.5 | 0.5 | 0.5 |
| TiO$_2$ | 5 | 5 | 5 |
| CaCO$_3$ | 5 | 5 | 5 |
| AIM | 8 | 8 | 8 |
| Pigment | 1 | 1 | 1 |
| PA | — | 0.6 | — |
| A-C ® 629A | — | — | 0.4 |
| Plate-Out | None. | None. | None. |

EXAMPLES 13 THROUGH 17

| Example | 13 | 14 | 15 | 16 | 17 |
|---|---|---|---|---|---|
| PVC | 100 | 100 | 100 | 100 | 100 |
| DBLP | 3 | 3 | 3 | 3 | 3 |
| DBLS | 1 | 1 | 1 | 1 | 1 |
| Ca Stearate | 0.5 | 0.5 | 0.5 | 0.5 | 0.5 |
| PSP | 0.5 | 0.5 | 0.5 | 0.5 | 0.5 |
| TiO$_2$ | 5 | 5 | 5 | 5 | 5 |
| CaCO$_3$ | 5 | 5 | 5 | 5 | 5 |
| AIM | 8 | 8 | 8 | 8 | 8 |
| Pigment | 1 | 1 | 1 | 1 | 1 |
| A-C ® 316 | 0.6 | — | 0.6 | — | — |
| A-C ® 392 | — | 0.6 | — | — | — |
| A-C ® 400 | — | — | 0.2 | — | 0.2 |
| A-C ® 307A | — | — | — | 0.6 | 0.6 |
| Plate-Out | High. | High. | High. | Light. | Light. |

The results indicate that the compositions of Examples 16 and 17 showed the lightest plate-out. As indicated by the compositions of Examples 13 through 15, plate-out increases proportionally with the value of the acid number of the external lubricant.

What is claimed is:

1. A method of lubricating a lead stabilized, metallic stearate-containing vinyl polymer composition comprising adding to said composition a polyethylene having a Brookfield viscosity at a temperature of 150° C. of between about 1000 and about 100000 centipoise and an acid number as determined by standardized titration of KOH of between about 1 and about 40.

2. The method of claim 1 wherein said vinyl polymer is polyvinyl chloride.

3. The method of claim 1 wherein said lead stabilizer is selected from the group consisting of tribasic lead sulfate, tetrabasic lead sulfate, dibasic lead phosphite, dibasic lead phosphite sulfite and lead phthalate.

4. The method of claim 1 wherein said metallic stearate is selected from the group consisting of cadmium stearate, manganese stearate, cesium stearate, lead stearate, lithium stearate, strontium stearate, sodium stearate, calcium stearate, barium stearate, and magnesium stearate.

5. The method of claim 1 wherein said polyethylene is present in an amount of from about 0.01 to about 10 parts by weight per 100 parts of said vinyl polymer.

6. The method of claim 1 wherein said polyethylene has a Brookfield viscosity of between about 2000 and about 90000 centipoises.

7. The method of claim 1 wherein said polyethylene has an acid number of between about 5 and about 40.

8. A rigid article comprising:
   (a) a vinyl polymer;
   (b) an effective amount for stabilizing said vinyl polymer of a lead stabilizer and metallic stearate; and
   (c) an effective amount for lubricating said vinyl polymer of polyethylene having a Brookfield viscosity at a temperature of 150° C. of between about 1000 and about 100000 centipoises and an acid number as determined by standardized titration of KOH of between about 1 and about 40.

9. The article of claim 8 wherein said article is pipe.

10. The article of claim 8 wherein said article is siding.

11. The article of claim 8 wherein said article is a container.

12. The article of claim 8 wherein said article is sheet.

* * * * *

UNITED STATES PATENT AND TRADEMARK OFFICE
CERTIFICATE OF CORRECTION

PATENT NO : 5,750,608
DATED : May 12, 1998
INVENTOR(S) : Lindner et al.

It is certified that error appears in the above-identified patent and that said Letters Patent is hereby corrected as shown below:

Column 6, line 20, delete "Theological" and substitute -- rheological -- therefor.

Column 11, line 9, after "the", delete -- 10 --.

Signed and Sealed this

Eighth Day of February, 2000

Attest:

Q. TODD DICKINSON

Attesting Officer

Commissioner of Patents and Trademarks